(12) United States Patent
Nguyen et al.

(10) Patent No.: US 9,117,216 B1
(45) Date of Patent: Aug. 25, 2015

(54) TIME CONTROL OF INTERNET USAGE

(75) Inventors: Hong T Nguyen, Atlanta, GA (US);
Edward M Silver, Atlanta, GA (US);
Linda A. Roberts, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2632 days.

(21) Appl. No.: 10/164,546

(22) Filed: Jun. 7, 2002

(51) Int. Cl.
*G06Q 40/00* (2012.01)
*G06Q 30/02* (2012.01)

(52) U.S. Cl.
CPC ...................................... *G06Q 30/02* (2013.01)

(58) Field of Classification Search
USPC ...................................................... 705/35–45
See application file for complete search history.

(56) References Cited

U.S. PATENT DOCUMENTS

| | | | |
|---|---|---|---|
| 5,835,722 A * | 11/1998 | Bradshaw et al. | 709/225 |
| 5,987,611 A * | 11/1999 | Freund | 726/4 |
| 6,366,298 B1 * | 4/2002 | Haitsuka et al. | 715/736 |
| 7,155,001 B2 * | 12/2006 | Tiliks et al. | 379/196 |
| 2002/0078059 A1 * | 6/2002 | Urera | 707/100 |
| 2002/0138737 A1 * | 9/2002 | Schulz | 713/182 |

\* cited by examiner

*Primary Examiner* — Olabode Akintola
(74) *Attorney, Agent, or Firm* — Hartman & Citrin LLC

(57) ABSTRACT

An Internet use profile is created by a parent or guardian of an Internet user via a client-side software application at the user's computer. The use profile is submitted via the Internet to an intelligent network component. The use profile sets the duration for Internet use in general and sets the duration for access to particular Internet sites such as chat rooms, shopping sites, etc. The use profile is stored locally on the user's computer and remotely at the intelligent network component. When the user attempts to log on to the Internet via her Internet service provider, the client-side application verifies that the user computer has not already exceeded allowed Internet connection time in a previous Internet connection. If not, the connection to the Internet is allowed. After the connection is established, an Internet usage monitoring and controlling application at the intelligent network component monitors the time of connection between the user computer and the Internet. Once the allowed time of connection expires, the monitoring and controlling application instructs the client-side application to disconnect the user computer from the Internet service provider. Prior to disconnection from the Internet service provider, the client-side computer requests a password from the user. If the password equals a password included in the Internet use profile, then the user is allowed to continue the Internet connection. Also, the user is allowed to modify the use profile with the entry of a correct password to include adding additional access time.

19 Claims, 7 Drawing Sheets

TIME CONTROL OF INTERNET USAGE

FIELD OF THE INVENTION

This invention relates to a method and system for controlling the amount of time a user is connected to the Internet in general or to a particular Internet site.

BACKGROUND OF THE INVENTION

With the advent of the Internet, a common problem associated with Internet usage is an excessive amount of time spent by users surfing the Internet in general or particular Internet sites such as chat rooms, shopping sites, and the like. Often users connect to the Internet and simply lose track of the amount of time they have spent browsing various Internet sites or the amount of time they have spent connected to a particular Internet site. This problem is particularly bothersome for parents or guardians of children or young adults who are concerned with the amount of time spent by those users connected to the Internet.

Systems have been used for controlling the amount of time a user is connected to the Internet whereby the Internet browser application in use by the user "times-out" and prevents the user from connecting to the Internet after a prescribed amount of time. Unfortunately such systems are easily circumvented by the user such as when the user downloads a different Internet browser application not controlled by the timing control mechanism in place on the user's system.

There is a need in the art for a method and system for allowing control of the amount of time a user spends connected to the Internet or to particular Internet sites that may not be easily circumvented by the user. It is with respect to these and other considerations that the present invention has been made.

SUMMARY OF THE INVENTION

In accordance with the present invention, the above and other problems are solved by a method and system for allowing control of the amount of time a user spends connected to the Internet or to particular Internet sites. An Internet use profile is created by a parent or guardian of an Internet user via a client-side software application at the user's computer. The use profile is submitted via the Internet to an intelligent network component or application server. The use profile sets the duration for Internet use in general and sets the duration for access to particular Internet sites such as chat rooms, shopping sites, etc. The use profile is stored locally on the user's computer and remotely at an intelligent telecommunications network component.

When the user attempts to log on to the Internet via her Internet service provider, the client-side application verifies that the user computer has not already exceeded allowed Internet connection time in a previous Internet connection. If not, the connection to the Internet is allowed. After the connection is established, an Internet usage monitoring and controlling application at the intelligent network component monitors the time of connection between the user computer and the Internet. Once the allowed time of connection expires, the monitoring and controlling application instructs the client-side application to disconnect the user computer from the Internet service provider. Prior to disconnection from the Internet service provider, the client-side computer requests a password from the user. If the password equals a password included in the Internet use profile, then the user is allowed to continue the Internet connection. Also, the user is allowed to modify the use profile with the entry of a correct password to include adding additional access time. Control of access to specific Internet sites may be done by specifying in the use profile the URLs of the specific Internet sites and by providing a maximum connection time to those sites. Alternatively, Internet keywords associated with types of Internet sites may be specified along with allowable access time to those types of sites.

These and other features and advantages, which characterize the present invention, will be apparent from reading of the following detailed description and a review of the associated drawings. It is to be understood that both the foregoing general description and the following detailed description are exemplary and explanatory only and are not restrictive of the invention as claimed.

DETAILED DESCRIPTION

The following description of an embodiment of the present invention is made with reference to the above-described drawings wherein like numerals refer to like parts or components throughout the several figures. The present invention is directed to a method and system for controlling the amount of time the user is connected to the Internet in general or to a particular Internet site.

Figure 1:
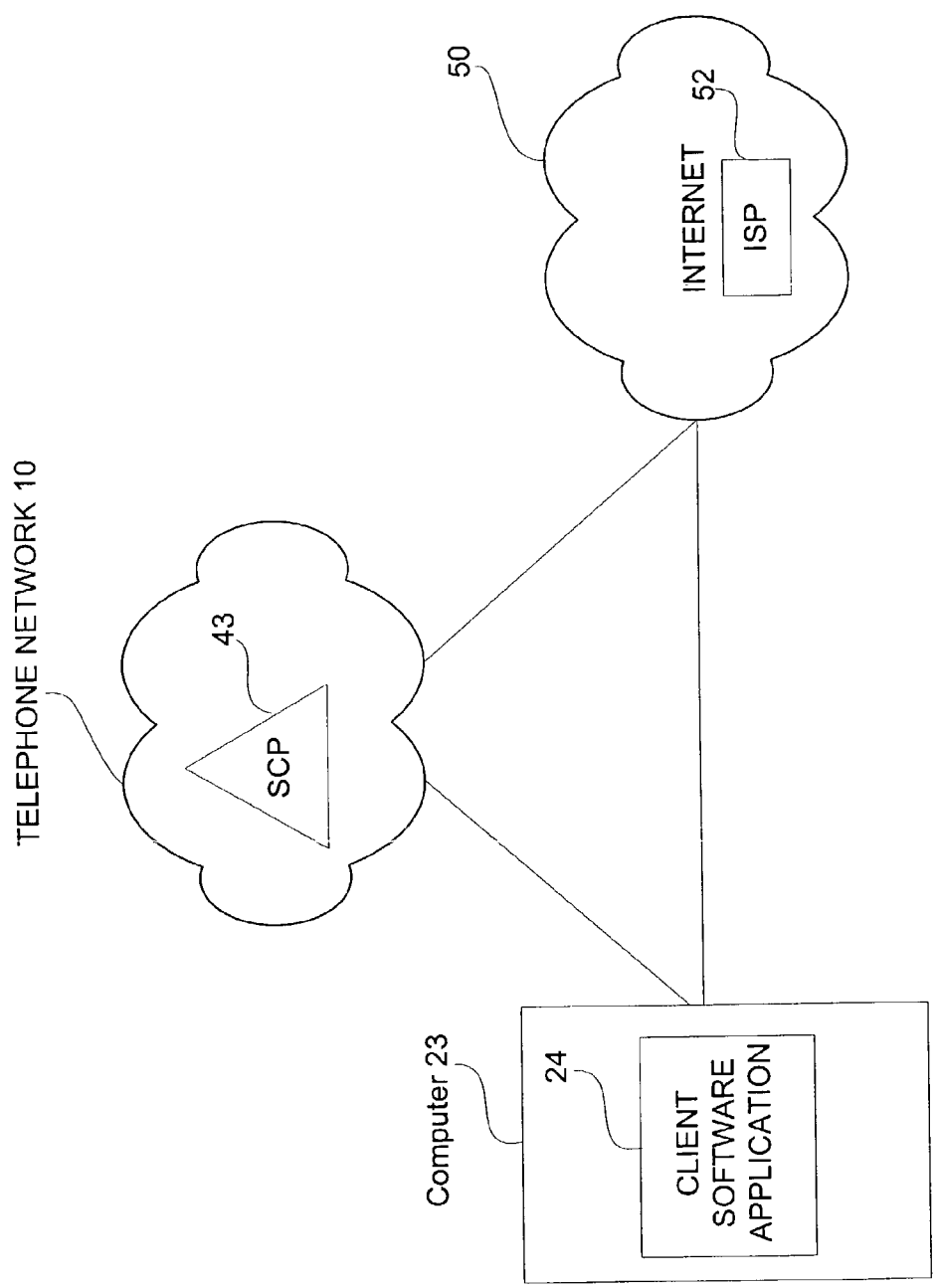
FIG. 1 is a simplified block diagram illustrating interaction of a client software application with a telephone network via the Internet according to an embodiment of the present invention.

Referring to FIG. 1, an Internet use profile is created by a parent or guardian of an Internet user via a client software application 24 at the user's computer 23. The usage profile sets the duration for Internet use in general and sets the duration for access to particular Internet sites such as chat rooms, shopping sites, etc. The usage profile is stored locally on the user's computer 23 and remotely at an intelligent network component such as the service control point 43 of the telephone network 10 or at a remote application server 65. According to an embodiment of the present invention, the telephone network 10 through which the user's computer 23 connects to the Internet 50 monitors and controls the user's access to the Internet or to particular Internet sites to remove the ability of the user to circumvent the system locally at the user's computer 23.

When the user attempts to log on to the Internet 50 via her Internet service provider 52, a first check of the usage profile is performed by the client software application 24 before the user is allowed access to the Internet 50. If the usage profile shows that the user has remaining allotted time for access to the Internet 50 or for access to particular Internet sites, the user is allowed to connect to the Internet 50 via the Internet service provider 52. After connection to the Internet 50, the client software application 24 performs a second check of the usage profile by polling, an Internet usage monitoring and controlling application at the service control point 43 of the telephone network 10 to determine whether the user does in fact have remaining allotted time to connect to the Internet 50 in general or to connect to particular Internet sites. Alternatively, monitoring and control of Internet 50 access may be performed at an application server remotely located from the computer 23 via the Internet 50 or via an Intranet, such as the server 65, illustrated in FIG. 2 below. In this case, the monitoring and controlling application at the server 65 is polled to determine whether the user does in fact have remaining allotted time to connect to the Internet 50 in general or to connect to particular Internet sites. As should be understood, the user may have circumvented the client software application 24 on her computer 23 to make changes to the usage profile stored at the computer 23.

If the first check of the usage profile at the computer 23 or the second check of the usage profile at the service control point 43 or server 65 show that the user's time for Internet access or for access to particular Internet sites has elapsed, a prompt is displayed to the user via the client software application 24 that requests a password from the parent or guardian to allow additional access time to the Internet 50 or to particular Internet sites. If the parent or guardian enters the correct password and allows for additional Internet access time, the usage profile is updated at both the computer 23 and at the service control point 43 or server 65, and the user's Internet access is allowed to continue. On the other hand, if the correct password is not provided, an application at the service control point 43 or server 65 instructs the client software application 24 to disconnect the Internet connection between the computer 23 and the Internet service provider 52.

Advantageously, the parent or guardian may control the user's time of access to the Internet 50 in general or to particular Internet sites, and the parent or guardian may in fact control their own use of the Internet 50 by setting allowable Internet access duration. Utilization of intelligent network components such as the service control point 43 for monitoring and controlling the user's access to the Internet 50 via the user's Internet service provider 52 prevents the user from circumventing the parent or guardian's wishes by reprogramming the client software application 24 or by downloading a separate Internet browsing application.

Exemplary Operating Environment

Figure 2:
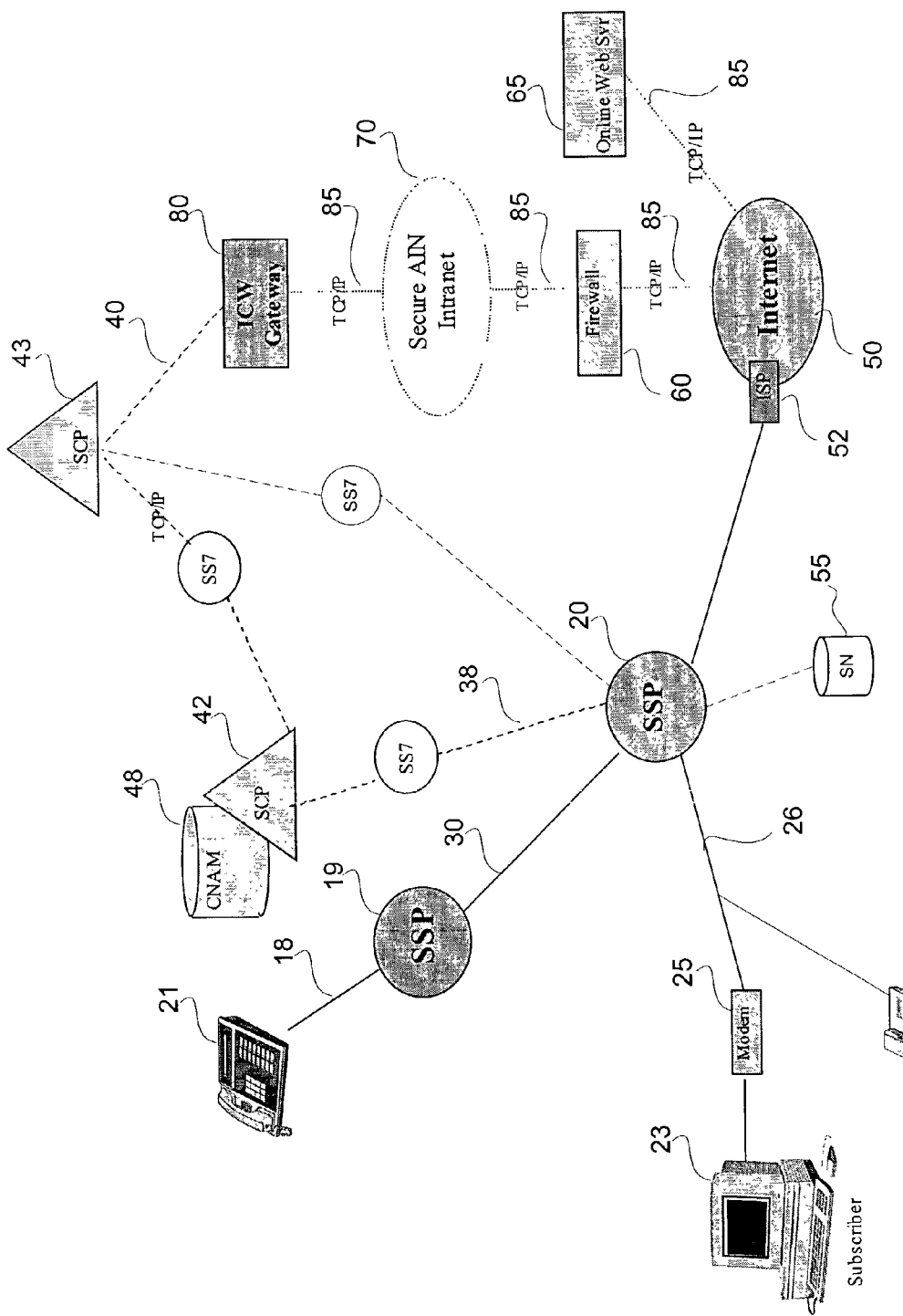
FIG. 2 is a block diagram illustrating components of a telecommunications network that provides an operating environment for the present invention.

FIG. 2 is a block diagram illustrating components of a telephone network that provides an exemplary operating environment for the present invention. The public switched telephone network that evolved in the 1980s incorporated the advanced intelligent network (AIN). Some of the components of the advanced intelligent network are illustrated in FIG. 2. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 2, each central office may include an electronic switch known to those skilled in the art as a service switching point (SSP). These are indicated in FIG. 2 as SSP switches 19 and 20. The terms "SSP" and "switch" are used interchangeably hereinafter and are understood to refer to a telecommunications switch having AIN capability and which may be utilized for connecting voice channel circuits, including voice channel lines, such as the trunk circuit 30.

As shown in FIG. 2, central offices switches (SSP) 19 and 20 have a plurality of subscriber lines 18 and 26 connected thereto. Each of the subscriber lines 18 and 26 is connected to a terminating piece or pieces of customer premises equipment that are represented by telephone 21 and computer 23. SSP switches 19 and 20 are connected by a trunk circuit 30. These are the voice path trunks that interconnect the central offices 19 and 20 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number.

Much of the intelligence, and the basis for many of the enhanced features of the network, resides in local AIN service control points (SCP) 42, 43. As is known to those skilled in the art, AIN service control points, such as SCP 43, are physically implemented by relatively powerful fault tolerant computers. Among the functions performed by the service control points 42, 43 is maintenance of network databases used in providing enhanced services. According to an embodiment of the present invention, the SCP 43 includes software applications and memory capacity for storing the Internet usage profile and for monitoring the usage of the Internet 50 or specific Internet sites or types of Internet sites by a user associated with the usage profile. Software applications at the SCP 43 may include a variety of modular software components, routines and application programming interfaces comprising an Internet usage monitoring and controlling application for monitoring and controlling Internet 50 use according to the usage profile and for interacting with the client software application 24 for controlling access to the Internet 50 according to the usage profile.

The SCP 42 is also connected to a caller name (CNAM) database 48. The CNAM database 48 comprises a plurality of directory numbers along with associated names for the directory numbers. The CNAM database 48 may be used to provide a look-up database to provide caller identification (ID) service. The CNAM database 48 may be comprised of directory numbers from wireline customers as well as wireless customers of a wireless network.

The modern Advanced Intelligent Network also includes service nodes (SN) such as service node 55. Those skilled in the art are familiar with service nodes, which are physically implemented by the same types of computers that embody the SCP 42. In addition to the computing capability and data base maintenance features, service nodes 55 use ISDN lines and may include DTMF signal recognition devices, tone generation devices, text to speech (TTS) voice synthesis devices and other voice or data resources.

The Internet 50 is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 50 and the TCP/IP transmission protocols is well known to those skilled in the art. The Firewall 60 is preferably a combination of hardware and software that prevents or limits exposure of computers or network computers to unauthorized access or attack from outside the protected computer or network of computers. Accordingly to the present invention, the Firewall 60 prevents or limits access to a secure telecommunications network wherein the functionality of the present invention resides. That is, the Firewall 60 prevents or limits unauthorized access to the data, files, messages, and the like of subscribers to the services of the telecommunications provider. The secure AIN Intranet 70 preferably is a distributed telecommunications and computing network for providing services in accordance with the present invention. The Internet Gateway 80 provides access to the secure AIN Intranet 70 by the other components of the telecommunications network illustrated in FIG. 2. As is well known to those skilled in the art, a gateway may provide a number of functions including connectivity between incompatible communications networks.

The server 65 is a computer or collection of computers functionally connected to the user computer 23 via the telecommunications network 10. The server 65 may be connected to the user computer 23 via a distributed computing network via the Internet 50, or alternatively, the server 65 may be connected to the computer 23 via a local or wide area intranet system. According to an embodiment of the present invention monitoring and control of Internet usage may be done at the server 65 as an alternative to the SCP 43, discussed above. Like the SCP 43, the server 65 includes software applications and memory capacity for storing the Internet usage profile and for monitoring the usage of the Internet 50 or specific Internet sites or types of Internet sites by a user associated with the usage profile. Software applications at the server 65 may include a variety of modular software components, routines and application programming interfaces comprising an Internet usage monitoring and controlling application for monitoring and controlling Internet 50 use according to the usage profile and for interacting with the client software application 24 for controlling access to the Internet 50 according to the usage profile. Communication between the computer 23 and the server 65 may be done according to a variety of methods including Internet-protocol (IP) packet switching, file transfer protocol (FTP) and Hypertext transfer protocol (HTTP).

User Interfaces

Figure 3:
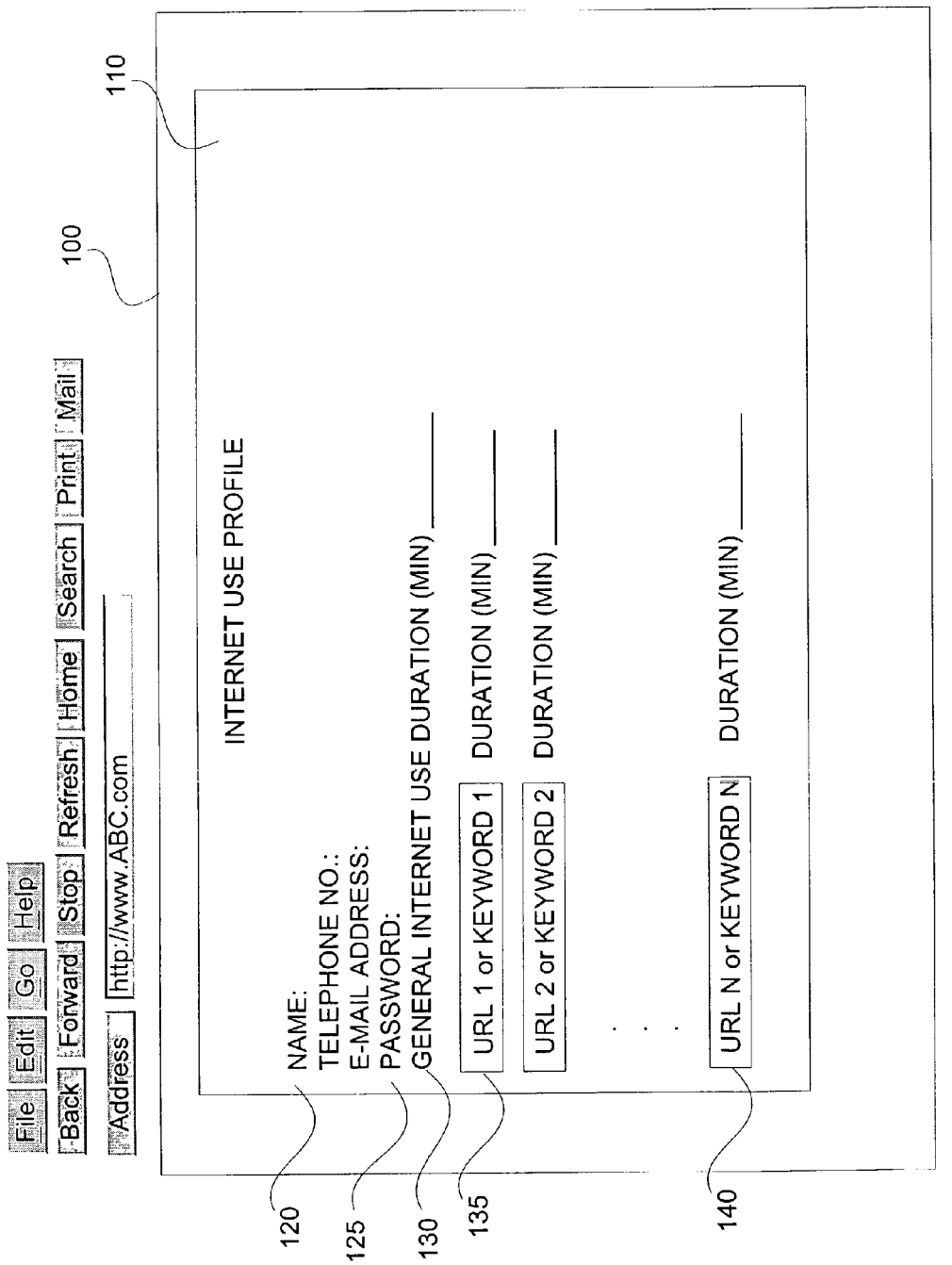
FIG. 3 illustrates a computer screen display showing a user interface for preparation of an Internet use profile according to an embodiment of the present invention.

FIG. 3 illustrates a computer screen display showing a user interface for preparation of an Internet use profile according to an embodiment of the present invention. According to the present invention, the Internet usage profile is prepared using the client software application 24 and is stored at both the user's computer 23 and at the remote service control point 43 of the telephone network 10 through which the computer 23 is connected to the Internet 50. As shown in FIG. 3, a dialog box 110 is displayed on the computer screen display 100 for allowing the user to create, store and transmit an Internet usage profile. As briefly described above, the user may be the parent or guardian of a child whose access to the Internet 50 or to particular Internet sites the parent or guardian wishes to control. Alternatively, the user may wish to create Internet usage profiles to control their own access to the Internet 50 to prevent themselves from spending too much time surfing the Internet 50 or connecting to particular Internet sites, such as chat rooms.

Referring to the dialog box 110 shown in FIG. 3, the user may enter the user's name, telephone number and the electronic mailing address 120. More importantly, the user enters a password 125 with which the user will be able to override the timing control mechanism of the present invention. The user may enter a general Internet usage duration 130 that will control the amount of time the user's computer 23 may be connected to the Internet 50 in general. As should be understood, the duration may be entered in minutes, hours or fractions of hours, and the like. The user may set the duration for particular Internet sites by entering the uniform resource locator (URL) of a particular Internet site 135 and a corresponding duration for allowing access to that particular URL. Alternatively, the user may enter an Internet keyword associated with a type of Internet site for controlling access to that type of Internet site. For example the user may set a time limit for all Internet sites associated with the keywords "sports" or "shopping." Or, if the user knows a particular keyword associated with an Internet site by the operator of that site, the user may enter that keyword to control access to that site. As illustrated in FIG. 3, the user may prescribe access duration for a number of different URLs for which the user desires to set a maximum amount of time of access. The URLs or keywords may be directed to chat rooms, shopping sites, games sites, and the like for which the user desires to set a maximum allowable access time.

Figure 4:
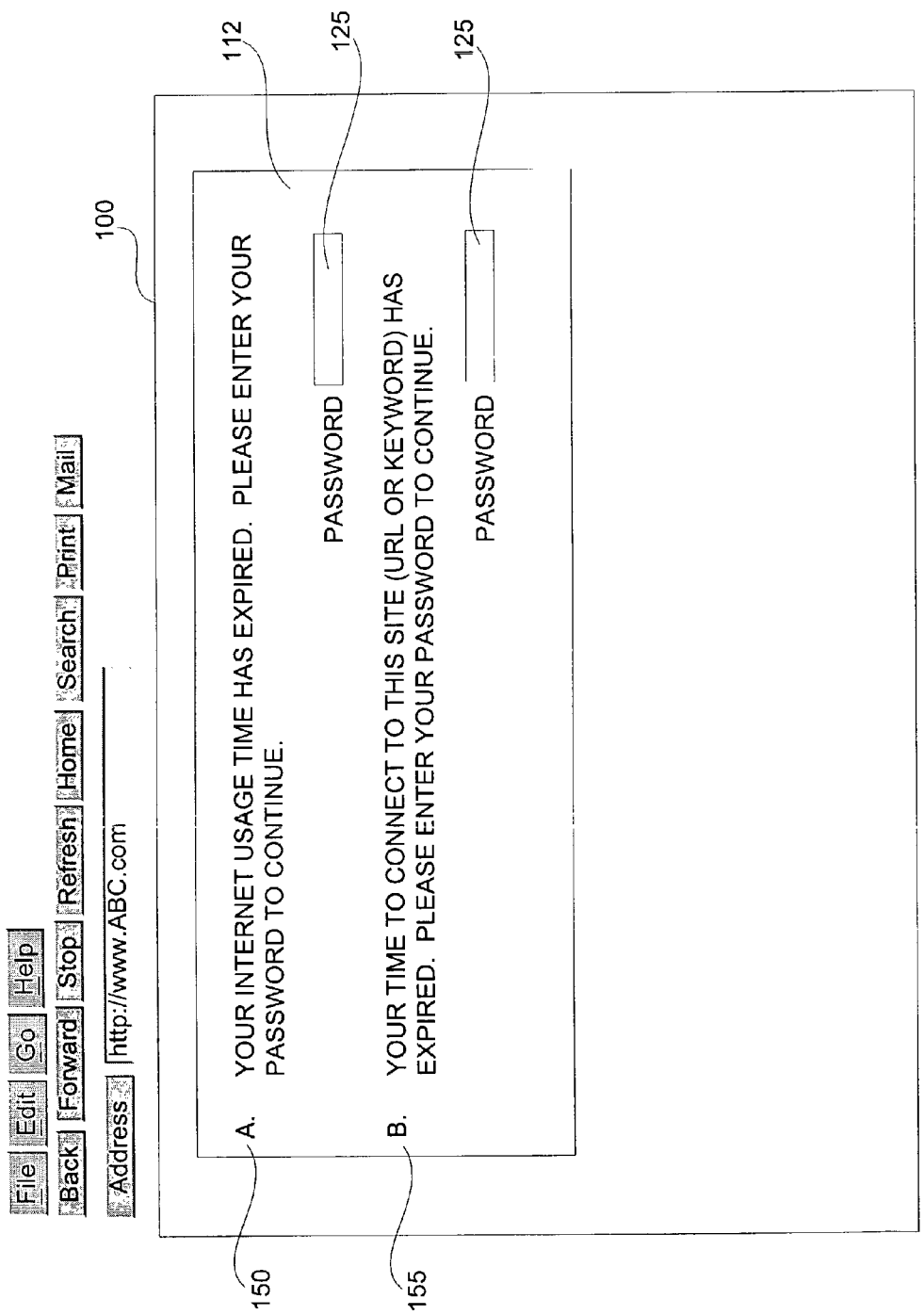
FIG. 4 illustrates a computer screen display showing a user interface for alerting a user of the expiration of the user's allotted Internet usage time according to the present invention.

Referring to FIG. 4, once the allotted time for access to the Internet 50 in general or for access to a specified URL has expired, a second dialog box 112 is presented to the user on the user's computer 23 to alert the user that her time has expired. For example, if the user's Internet access time has expired, a message 150 may be presented to the user to alert the user that her time has expired. A password box 125 is presented to the user to allow the user to override the timing control mechanism by entering a correct password. If the user's allotted time for access to a particular Internet site has expired, the user may be presented with a prompt 155 to alert the user that her time for connection to the particular URL has expired. A password box 125 is also provided to the user to allow the user to enter a correct password to override the timing control mechanism of the present invention.

Figure 5:
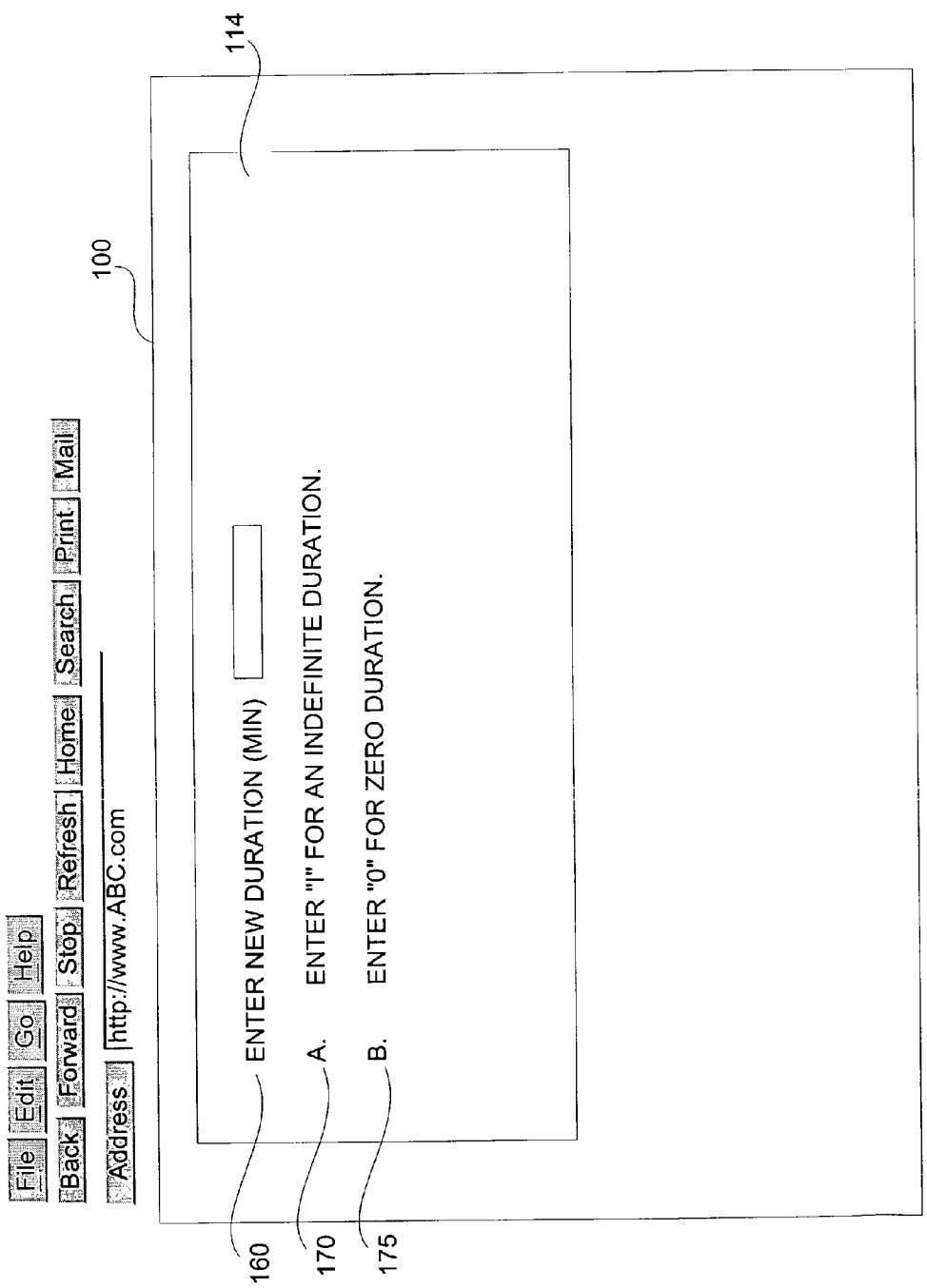
FIG. 5 illustrates a computer screen display showing a user interface for allowing a user to modify the Internet use profile illustrated in FIG. 3.

Referring to FIG. 5, if the user enters a correct password in response to the prompts provided by the client software application 24 and illustrated in FIG. 4, a third dialog box 114 is presented to the user to allow the user to enter a new duration 160. That is, if the user is prompted that her access to either the Internet 50 in general or to a particular Internet site has expired, the user, upon entry of a correct password, may enter additional time for access to the Internet 50 in general or to a particular Internet site. As shown in FIG. 5, the user may enter a new duration time 160 or the user may enter a code such as "I" for indefinite duration 170, or the user may enter "0" to indicate zero duration which, of course, means that duration 175 for access to the Internet in general or to the particular Internet site is precluded.

Operation

Figure 6:
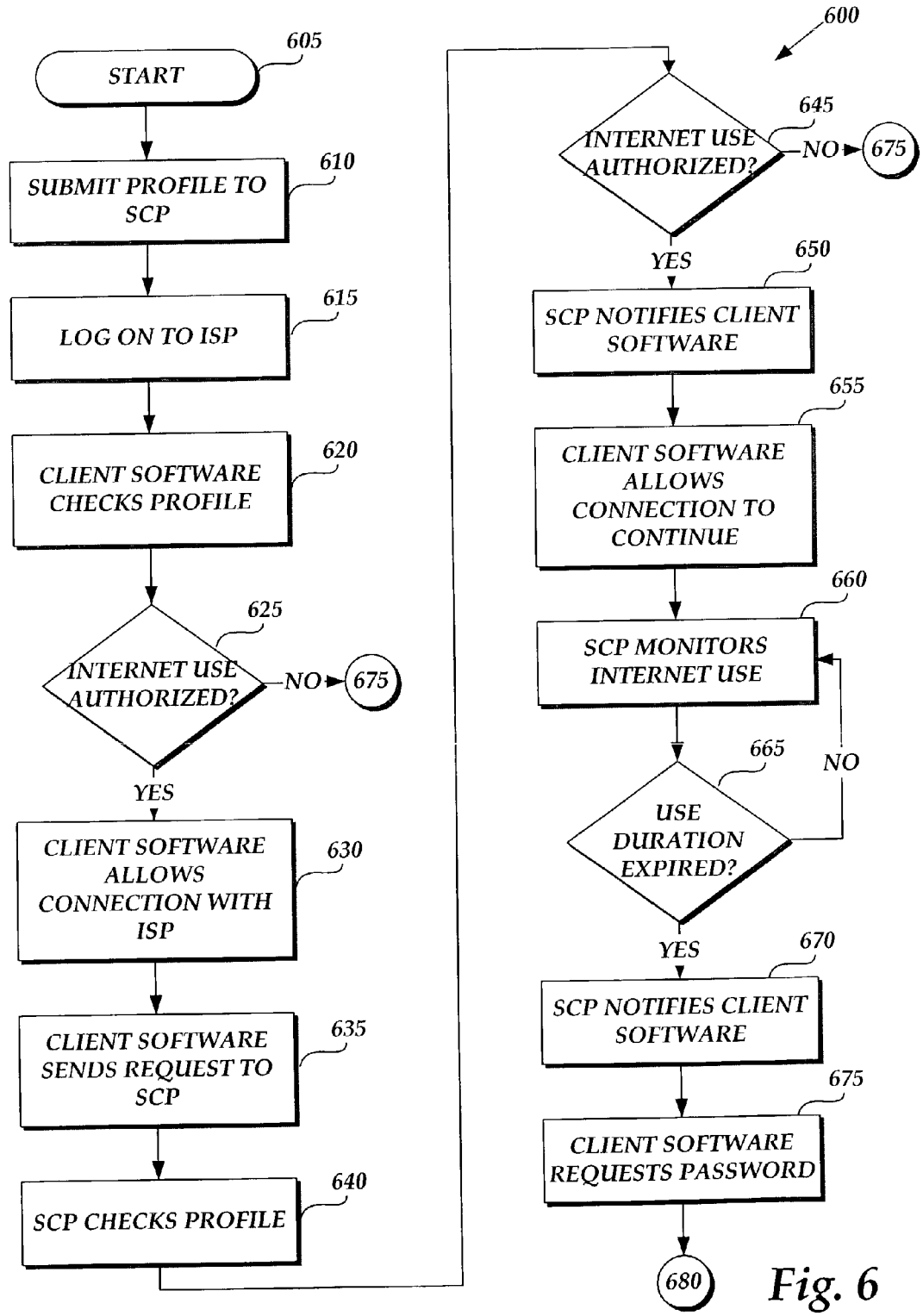
FIGS. 6 and 7 are flow diagrams illustrating the steps performed by a method and system of the present invention for controlling the amount of time a user is connected to the Internet in general or to a particular Internet site.

Having described an exemplary operating environment and exemplary user interfaces with reference to FIGS. 1-5, the following is a description of the logical call flow of a system and method of the present invention for controlling the amount of time a user has access to the Internet 50 in general and/or particular Internet sites. Referring to FIG. 6, the method 600 begins at start step 605 and proceeds to step 610 where the user creates an Internet usage profile using the dialog box 110 presented by the client software application 24 illustrated in FIG. 3. As described above with reference to FIG. 3, the user may be the parent or guardian of a young Internet user, or the user may wish to control her own access to the Internet 50.

Utilizing the dialog box 110, the user enters the amount of time allowed for general Internet access 130, and the user enters any particular URLs or keywords and corresponding amounts of time during which the user may access those URLs or keywords. For purposes of the following description, entry of an URL by the user includes entry of an Internet keyword. At step 610, after the user has prepared the Internet usage profile, the user saves the profile locally at the user's computer 23 and submits the usage profile to the service control point 43 via the application 24. As should be understood, the usage profile may be submitted to the SCP 43 by logging onto an Internet Web site of the telecommunications service provider operating the telecommunications network 10 through which the user connects to the Internet service provider 52 and the Internet 50. If monitoring and control of the prescribed Internet usage is done at the server 65, then the usage profile is submitted to the server 65. For purposes of the following description, steps involving the SCP 43 may alternatively be performed at the server 65, as described above with reference to FIG. 2.

Alternatively, the user may submit the usage profile to the service control point 43 via non Internet-based methods. For example, the user may call in the usage profile through the SCP 43. For example, the user may select a star code such as "*26" on the keypad of the user's telephone 22. In response to entry of the star code, the user may be provided with an audible prompt that requests from the user the duration of access time to the Internet 50 for computers connected to the telecommunications network 10 from the user's line 26.

At step 610, the Internet usage profile is submitted to the service control point 43 where the user's access to the Internet 50 and/or to particular Internet sites will be monitored. At step 615, a user of the computer 23 launches her Internet browser application and attempts to log on to the Internet 50 via the Internet service provider 52. At step 620, the client software application 24 detects the user's attempt to log on to the Internet service provider 52 and checks the usage profile submitted previously for the user's computer 23.

At step 625, the client software application 24 checks the Internet usage profile stored at the computer 23 to determine whether the user is authorized to access the Internet 50 and/or particular Internet sites. That is, the client software application 24 determines whether the user has remaining allotted time for accessing the Internet 50 by comparing the expired time versus the originally allotted time entered during preparation of the Internet usage profile. If a determination is made that the user is not authorized additional access to the Internet 50 in general or additional access to particular Internet sites, the method proceeds to step 675, discussed in detail below. If the user has remaining time for accessing the Internet 50, the method proceeds to step 630 and the client software application 24 allows connection of the computer 23 with the Internet service provider 52 via the user's Internet browser.

At step 635, after connection with the Internet 50, the client software application 24 sends a request to the service control point 43 to check the Internet usage profile stored at the service control point 43. In order to send the request to the service control point 43, the request from the client software application is passed through the Internet 50, through the firewall 60, through the gateway 80 and to the SCP 43, as described above with reference to FIG. 2. At step 640, the service control point 43 checks the Internet usage profile to determine whether the user is in fact authorized to access the Internet 50. If the user has entered a specific Internet site URL during the user's log on to the Internet 50 at step 615, a check is also performed at the service control point 43 as to whether that particular URL is a URL prescribed in the Internet usage profile for a set amount of access time.

At step 645, a determination is made at the service control point 43 as to whether the general Internet use or access to the particular URL are authorized. If a determination is made that the user is not authorized additional access to the Internet 50 in general or additional access to particular Internet sites, the method proceeds to step 675, discussed in detail below. If access to the Internet 50 and/or access to the particular URL requested by the user are authorized, the method proceeds to step 650 and the service control point 43 notifies the client software application 24. At step 655, the client software application 24 allows the access to the Internet 50 requested by the user to continue. Or, if the requested action is access to a particular URL, and allotted time is remaining, or if no limitations are placed on access to that URL, the client software 24 allows connection to the Internet site specified by that URL to continue.

At step 660, the service control point 43 monitors the Internet use by the user. In order to monitor the Internet use by the user, the client software application 24 monitors the user's activities by monitoring the user's Internet browser. Periodically, the client software application 24 forwards the elapsed time of Internet access and the elapsed time of access to particular Internet sites to the service control point 43. At step 665, a determination is made at the service control point 43 on a periodic basis whether the time allotted for Internet access or the time allotted for access to particular Internet sites has expired. If not, the method proceeds back to step 660 and the SCP 43 continues to monitor the user's access to the Internet 50. If at step 665, the SCP 43 determines that the user's allotted time for access to the Internet 50 in general or to a particular Internet site has expired, the method proceeds to step 670, and the service control point 43 notifies the client software application 24 that the user's time has expired.

At step 675, the client software application 24 presents the user the dialog box 112, illustrated in FIG. 4, to request a password from the user. As described above with reference to FIG. 4, the dialog box may present the user with a message 150 alerting the user that her Internet usage time has expired and requesting that the user enter her password to continue. Alternatively, if the user's time for access to the Internet 50 in general has not expired, but the user's time for access to a particular Internet site (URL) has expired, the user may be presented with a message 155 alerting the user that her time to connect to this particular Internet site has expired and requesting that the user enter her password to continue.

Figure 7:
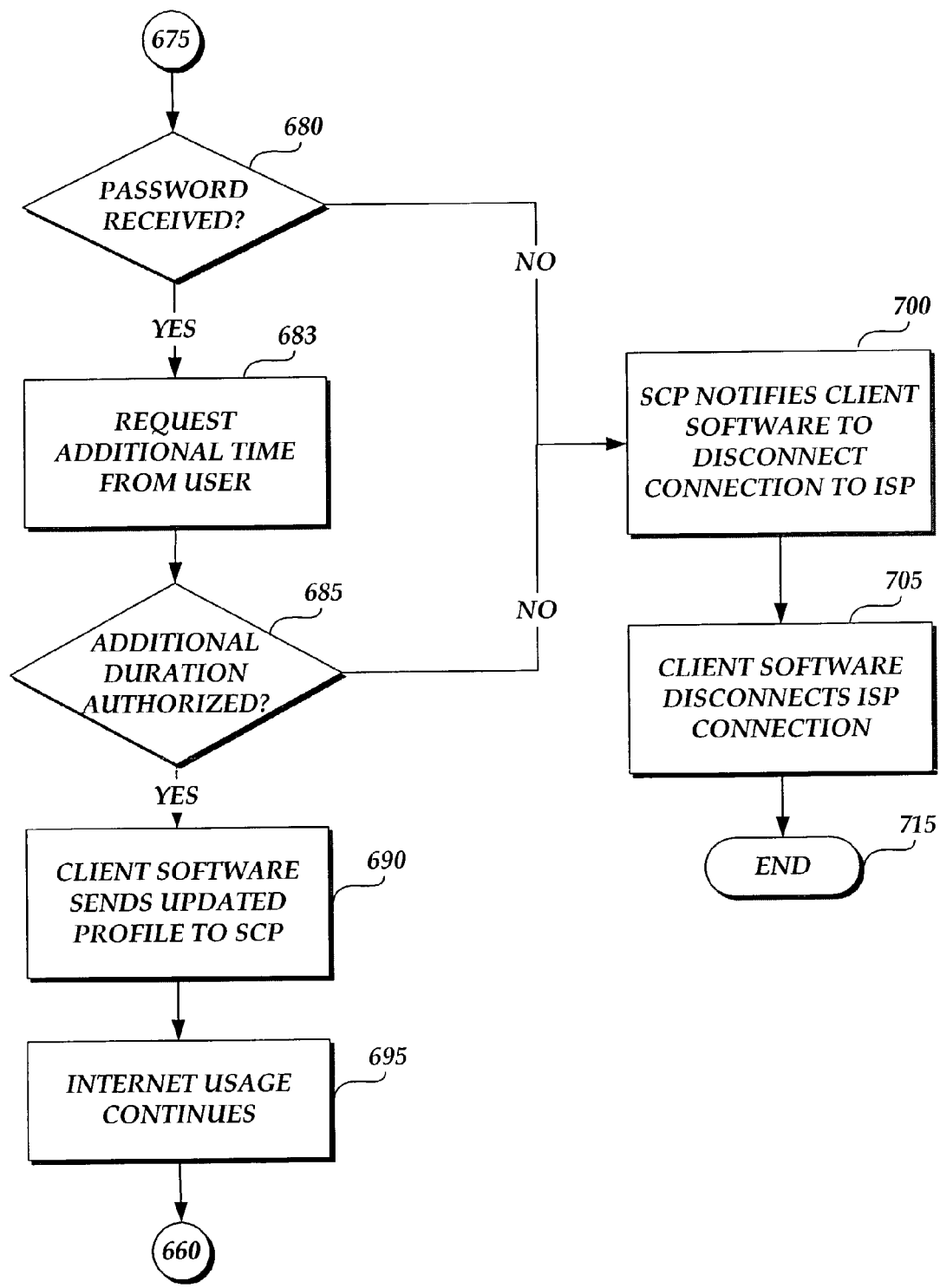

Referring now to FIG. 7, at step 680, a determination is made at the service control point 43 as to whether a correct password has been entered by the user via the dialog box 112. Prior to the determination, the software application 24 submits the password entered by the user to the service control point 43 via the Internet 50 as described above. If a correct password is not received at the service control point 43, the service control point 43 notifies the client software application 24 to disconnect the connection between the computer 23 and the Internet service provider 52. According to a preferred embodiment, in order to prevent the user from unauthorized tampering with the programming of the client software application 24 to avoid the timing control mechanism of the present invention, the service control point 43 will automatically disconnect the connection between the computer 23 and the Internet service provider 52 if the password entered by the user is incorrect after a set number of password entry attempts or if the data relating to the elapsed time of Internet access or elapsed time of access to a particular Internet site maintained at the service control point 43 differs from that data maintained by the client software application 24 at the computer 23. At step 705, the client software application 24 disconnects the connection between the computer 23 and the Internet service provider 52, and the method ends at step 715.

If a proper password is received by the service control 43 point at step 680, the method proceeds to step 683, and the service control point 43 notifies the client software application 24 to request additional Internet access time from the user. In response, the dialog box 114 illustrated in FIG. 5 is presented to the user on the computer screen 100 of the user's computer 23. If the user desires to access the Internet 50 for additional time, the user may enter additional time in minutes, hours, or fractions of hours as described above with reference to FIG. 5. Alternatively, the user may enter a code such as "I" to indicate that Internet access is for an indefinite duration. Alternatively, the user may enter "0" duration that indicates that no additional duration for access to the Internet 50 in general or for access to a particular Internet site is authorized.

At step 685, a determination is made at the client software application 24 as to whether additional duration time has been entered for general Internet access or for access to a particular Internet site. If additional time has been entered by the user at step 683, the method proceeds to step 690, and the client software application 24 sends an updated Internet usage profile to the service control point 43. At step 695, Internet usage by the user is allowed to continue, and the method proceeds back to step 660 where the service control point 43 monitors the user's access to the Internet 50 or to particular Internet sites in accordance with the updated Internet usage profile submitted to the service control point at step 690.

Referring back to step 685, if the user does not enter additional time for general Internet access or for access to particular Internet sites, the method proceeds to step 700, and the service control point 43 notifies the client software application 24 to disconnect the connection to the Internet service provider 52 as described above. Advantageously, utilization of intelligent network components such as the service control point 43 for monitoring and controlling the user's access to the Internet 50 via the user's Internet service provider 52 prevents the user from circumventing the parent or guardian's wishes by reprogramming the client software application 24 or by downloading a separate Internet browsing application.

As described, a method and system are provided for utilizing an intelligent telecommunications network component for controlling the amount of time a user has access to the Internet 50 in general or the amount of time a user has access to a particular Internet site. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method comprising:
   receiving, at a user computing device via a client-side software application resident on the user computing device, an internet usage profile setting an allowed time for accessing an internet and including a password;
   saving, by the user computing device, the internet usage profile at the user computing device;
   submitting, by the user computing device, the internet usage profile to an internet usage monitoring and controlling application resident at a server remotely located from the user computing device;
   allowing, by the user computing device, the user computing device to establish a connection with the internet;
   monitoring, by the server, an actual time of the connection between the user computing device and the internet;
   comparing, by the server, the actual time of the connection between the user computing device and the internet with the allowed time for accessing the internet;
   determining, by the server, that the actual time of the connection between the user computing device and the internet equals the allowed time for accessing the internet indicating that the allowed time for accessing the internet has expired;
   after determining that the actual time of the connection between the user computing device and the internet equals the allowed time, providing, by the server, instructions to the client-side software application to disconnect the connection between the user computing device and the internet;
   before proceeding with disconnecting the connection between the user computing device and the internet, requesting, by the user computing device, a user password from a user of the user computing device;
   upon receipt of the user password, determining, by the server, whether the user password matches the password of the internet usage profile;
   in response to determining that the user password matches the password of the internet usage profile, then:
      requesting, by the server, an updated allowed time for accessing the internet,
      allowing, by the user computing device, the user computing device to remain connected to the internet,
      continuing to monitor, by the server, the actual time of the connection between the user computing device and the internet, and
      comparing, by the server, the actual time of the connection between the user computing device and the internet with the updated allowed time for accessing the internet;
   in response to determining that the user password does not match the password of the internet usage profile, then disconnecting the connection between the user computing device and the internet;
   prior to allowing the user computing device to establish the connection with the internet, determining that at least a portion of the allowed time for accessing the internet, as set in the internet usage profile saved at the user computing device, is remaining;
   after allowing the user computing device to establish the connection with the internet, sending a request to the server to check the internet usage profile at the server to determine whether at least a portion of the allowed time for accessing the internet, as set in the internet usage profile at the server, is remaining; and
   in response to the internet usage profile at the server indicating at least a portion of the allowed time for accessing the internet is remaining, allowing the connection with the internet to continue.

2. The method of claim 1, wherein receiving the internet usage profile further includes:
   receiving an identification of specific internet sites; and
   receiving an amount of time allowed for accessing the specific internet sites.

3. The method of claim 2, wherein the specific internet sites are each identified by a uniform resource locator.

4. The method of claim 1, wherein receiving the internet usage profile further includes receiving a keyword associated with a type of internet site such that an amount of time for accessing the type of internet site associated with the keyword is monitored and controlled.

5. The method of claim 1, wherein the internet usage profile is created and submitted to the server via an internet-based web site.

6. The method of claim 5, wherein the internet usage profile is submitted to the server via the internet.

7. The method of claim 1, further comprising requesting the user to modify the internet usage profile to add additional allowed time for accessing the internet.

8. The method of claim 1, further comprising receiving a request at the user computing device to modify the internet usage profile to add additional allowed time for accessing the internet.

9. The method of claim 1, wherein allowing the user computing device to establish the connection with the internet comprises causing the client-side software application resident on the user computing device to establish the connection via an internet service provider.

10. The method of claim 9, further comprising after the user computing device is connected to the internet via the internet service provider, causing the client-side software application to request that the internet usage monitoring and controlling application monitor the connection between the user computing device and the internet.

11. The method of claim 10, wherein monitoring the connection between the user computing device and the internet includes monitoring the actual time of the connection between the user computing device and the internet at the internet usage monitoring and controlling application.

12. The method of claim 1, wherein determining whether the user password matches the password of the internet usage profile includes determining at the internet usage monitoring and controlling application whether the user password matches the password of the internet usage profile.

13. The method of claim 1, further comprising in response to determining that the user password does not match the password of the internet usage profile, then:
providing another request for the user password from the user of the user computing device, and
in response to determining that a number of attempts at providing the user password exceeds a prescribed number of password entry attempts, then terminating the connection between the user computing device and the internet.

14. A method comprising:
receiving, at a user computing device via a client-side software application resident on the user computing device, an internet usage profile setting an allowed time for accessing an internet and including a password;
saving, by the user computing device, the internet usage profile at the user computing device;
submitting, by the user computing device, the internet usage profile to an internet usage monitoring and controlling application resident at a server remotely located from the user computing device;
allowing, by the user computing device, the user computing device to establish a connection with the internet;
monitoring, by the server, an actual time of the connection between the user computing device and the internet;
comparing, by the server, the actual time of the connection between the user computing device and the internet with the allowed time for accessing the internet;
determining, by the server, that the actual time of the connection between the user computing device and the internet equals the allowed time for accessing the internet indicating that the allowed time for accessing the internet has expired;
after determining that the actual time of the connection between the user computing device and the internet equals the allowed time, providing, by the server, instructions to the client-side software application to disconnect the connection between the user computing device and the internet;
before proceeding with disconnecting the connection between the user computing device and the internet, requesting, by the user computing device, a user password from a user of the user computing device;
upon receipt of the user password, determining, by the server, whether the user password matches the password of the internet usage profile;
in response to determining that the user password matches the password of the internet usage profile, then:
requesting, by the server, an updated allowed time for accessing the internet,
allowing, by the user computing device, the user computing device to remain connected to the internet,
continuing to monitor, by the server, the actual time of the connection between the user computing device and the internet, and
comparing, by the server, the actual time of the connection between the user computing device and the internet with the updated allowed time for accessing the internet;
maintaining, at the user computing device, a first elapsed time of access to the internet associated with the user computing device;
maintaining, at the server, a second elapsed time of access to the internet associated with the user computing device; and
disconnecting the connection between the user computing device and the internet when the first elapsed time of access to the internet associated with the user computing device differs from the second elapsed time of access to the internet associated with the user computing device.

15. The method of claim 14, wherein receiving the internet usage profile further includes:
receiving an identification of specific internet sites; and
receiving an amount of time allowed for accessing the specific internet sites.

16. The method of claim 15, wherein the specific internet sites are each identified by a uniform resource locator.

17. The method of claim 14, wherein receiving the internet usage profile further includes receiving a keyword associated with a type of internet site such that an amount of time for accessing the type of internet site associated with the keyword is monitored and controlled.

18. The method of claim 14, wherein the internet usage profile is created and submitted to the server via an internet-based web site.

19. The method of claim 14, further comprising in response to determining that the user password does not match the password of the internet usage profile, then proceeding with disconnecting the connection between the user computing device and the internet.

* * * * *